(12) United States Patent
Roach et al.

(10) Patent No.: US 12,172,755 B2
(45) Date of Patent: *Dec. 24, 2024

(54) HYBRID WATER STORAGE SYSTEM FOR AIRCRAFT

(71) Applicant: GOODRICH CORPORATION, Charlotte, NC (US)

(72) Inventors: Kevin Edward Roach, Stow, OH (US); Donald Gregory Roulett, Akron, OH (US); Martin Lei, Canal Fulton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,943

(22) Filed: Oct. 16, 2023

(65) Prior Publication Data

US 2024/0043120 A1 Feb. 8, 2024

Related U.S. Application Data

(62) Division of application No. 17/181,029, filed on Feb. 22, 2021, now Pat. No. 11,820,513.

(Continued)

(51) Int. Cl.
*B64D 11/02* (2006.01)
*B64D 11/00* (2006.01)

(52) U.S. Cl.
CPC .......... *B64D 11/02* (2013.01); *B64D 11/0007* (2013.01); *Y10T 137/6906* (2015.04)

(58) Field of Classification Search
CPC .......... Y10T 137/6906; B64D 11/0007; B64D 11/02; B64D 11/04; B60P 3/32
See application file for complete search history.

(56) References Cited

U.S. PATENT DOCUMENTS

| 5,303,728 A | 4/1994 | Senatore |
| 5,454,936 A | 10/1995 | Ask et al. |

(Continued)

FOREIGN PATENT DOCUMENTS

| DE | 102004029040 | 12/2005 |
| EP | 2695812 | 2/2014 |

(Continued)

OTHER PUBLICATIONS

European Patent Office, European Search Report dated Jul. 31, 2023 in Application No. 23181547.3.

(Continued)

*Primary Examiner* — Kevin F Murphy
(74) *Attorney, Agent, or Firm* — SNELL & WILMER L.L.P.

(57) ABSTRACT

A hybrid water storage system for an aircraft includes separate variable volumes for respectively storing/holding potable water and gray water occupying a common container. The hybrid water storage system is generally configured to draw potable water from a first variable volume in order to provide fresh water to one or more aircraft appliances (e.g., sinks, showers, ice-makers, etc.), and the used potable water (i.e., the potable water that is collected in drains from the aircraft appliances), referred to herein as gray water, is routed to a second variable volume that occupies the same container as the first variable volume.

5 Claims, 6 Drawing Sheets

Related U.S. Application Data

(60) Provisional application No. 63/011,462, filed on Apr. 17, 2020.

(56) References Cited

U.S. PATENT DOCUMENTS

| | | | |
|---|---|---|---|
| 7,178,474 | B2 | 2/2007 | Warnes |
| 7,971,602 | B2 | 7/2011 | Lewis |
| 8,074,933 | B2 | 12/2011 | Mackulin |
| 8,720,125 | B2 | 5/2014 | Andrertich |
| 11,820,513 | B2 * | 11/2023 | Roach ................ B64D 11/0007 |
| 2005/0284353 | A1 | 12/2005 | Warnes |
| 2014/0041110 | A1 | 2/2014 | Dannenberg |

FOREIGN PATENT DOCUMENTS

| | | |
|---|---|---|
| WO | 8503056 | 7/1985 |
| WO | 2004053242 | 6/2004 |

OTHER PUBLICATIONS

European Patent Office, European Search Report dated Aug. 23, 2021 in Application No. 21168548.2.
USPTO; Requirement for Restriction dated Dec. 9, 2022 in U.S. Appl. No. 17/181,029.
USPTO; Non-Final Office Action dated Jan. 27, 2023 in U.S. Appl. No. 17/181,029.
USPTO; Final Office Action dated May 18, 2023 in U.S. Appl. No. 17/181,029.
USPTO; Notice of Allowance dated Jul. 27, 2023 in U.S. Appl. No. 17/181,029.

* cited by examiner

HYBRID WATER STORAGE SYSTEM FOR AIRCRAFT

CROSS-REFERENCE TO RELATED APPLICATIONS

This application is a divisional of, claims priority to and the benefit of, U.S. patent application Ser. No. 17/181,029 filed on Feb. 22, 2021 and entitled "HYBRID WATER STORAGE SYSTEM FOR AIRCRAFT" (hereinafter the '029 Application). The '029 Application claims priority to, and the benefit of, U.S. Ser. No. 63/011,462 filed Apr. 17, 2020 and entitled "HYBRID WATER STORAGE SYSTEM FOR AIRCRAFT." Both of which hereby incorporated by reference in their entirety for all purposes.

FIELD

The present disclosure relates to water storage systems for aircraft, and in particular to a hybrid water storage system that includes separate variable volumes for potable water and gray water occupying a common container.

BACKGROUND

Aircraft generally include one or more containers for storing potable water. The potable water may be used to supply sinks, showers, and other appliances on the aircraft. Spent drainage water from such appliances is often referred to as gray water or sullage, and thus gray water generally refers to waste water without urine or fecal contamination (e.g., waste streams from appliances other than toilets). Many conventional aircraft include a system or mechanism for expelling the gray water from the aircraft during flight. For example, many conventional aircraft include a drain mast or other feature that extends from the body of the aircraft to facilitate discharge of the gray water. However, the drag/air resistance caused by drain masts may negatively affect the efficiency, speed, range, and overall performance of the aircraft. Conventional solutions to this problem include adding an additional container to the aircraft for storing gray water. However, because space is limited on most aircraft, making room for an extra gray water storage container may be challenging.

SUMMARY

In various embodiments, the present disclosure provides a hybrid water storage system for an aircraft. The hybrid water storage system may include a container defining a chamber. The hybrid water storage system may further include a first variable volume fluid vessel disposed in the chamber, wherein the first variable volume fluid vessel is configured to store potable water. Still further, the hybrid water storage system may also include a second variable volume fluid vessel also disposed in the chamber, wherein the second variable volume fluid vessel is configured to store gray water.

In various embodiments, the hybrid water storage system further includes, or interfaces with, a water-use assembly. The water-use assembly generally extends between and fluidly interconnects the first variable volume fluid vessel and the second variable volume fluid vessel, according to various embodiments. The first variable volume fluid vessel and the second variable volume fluid vessel may be fluidly isolated from each other but for the water-use assembly. That is, the water-use assembly may be the exclusive fluid communication pathway between the first variable volume fluid vessel and the second variable volume fluid vessel.

In various embodiments, the water-use assembly comprises at least one of tubing and piping configured to deliver the potable water from the first variable volume fluid vessel to an aircraft appliance, and configured to deliver gray water from the aircraft appliance to the second variable volume fluid vessel. In various embodiments, the water-use assembly comprises a gray water sump and a gray water pump, wherein the gray water sump is configured to receive the gray water from the aircraft appliance and the gray water pump is configured to pump the gray water from the gray water sump to the second variable volume fluid vessel. The system may further include a controller configured to control the gray water pump. In various embodiments, the system also includes at least one of a water level sensor and a water flow sensor coupled in feedback providing communication with the controller.

In various embodiments, the hybrid water storage system further comprises a gray water overflow container coupled in overflow receiving communication with the second variable volume fluid vessel. The first variable volume fluid vessel may be a first bladder and the second variable volume fluid vessel may be a second bladder. Each of the first bladder and the second bladder is independently removable from the chamber defined by the container, according to various embodiments.

In various embodiments, a volumetric fluid capacity of the first variable volume fluid vessel is between 80% and 99% of a volume of the chamber. In various embodiments, a volumetric fluid capacity of the first variable volume fluid vessel is between 90% and 98% of a volume of the chamber. In various embodiments, a volumetric fluid capacity of the first variable volume fluid vessel is between 95% and 98% of a volume of the chamber.

Also disclosed herein, according to various embodiments, is a hybrid water storage system for an aircraft that includes a bladder disposed in a chamber, wherein the bladder defines a first variable volume and the bladder is configured to store potable water. A second variable volume is defined between external surfaces of the bladder and internal surfaces of the container, wherein the second variable volume is configured to store gray water, according to various embodiments. The system may further include, or at least interface with, a water-use assembly extending between and fluidly interconnecting the bladder and the second variable volume. The first variable volume of the bladder and the second variable volume are fluidly isolated from each other but for the water-use assembly, such that the water-use assembly is the exclusive fluid communication pathway between the first variable volume and the second variable volume. In various embodiments, the water-use assembly comprises at least one of tubing and piping configured to deliver the potable water from the first variable volume to an aircraft appliance, and configured to deliver gray water from the aircraft appliance to the second variable volume.

Also disclosed herein, according to various embodiments, is a method of managing water storage on an aircraft. The method may include filling a first bladder with an initial charge of potable water. The first bladder may be disposed within a chamber defined by a container, wherein in response to the initial charge the first bladder occupies between 90% and 98% of a volume of the chamber. The method may further include, in response to the potable water becoming gray water after use, directing the gray water to a second bladder disposed within the chamber. Directing the gray water to the second bladder may comprise actuating a gray water pump, by a controller, to drive the gray water to the second bladder. The method may also further include receiving feedback, by the controller, from at least one of a water level sensor and a water flow sensor.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
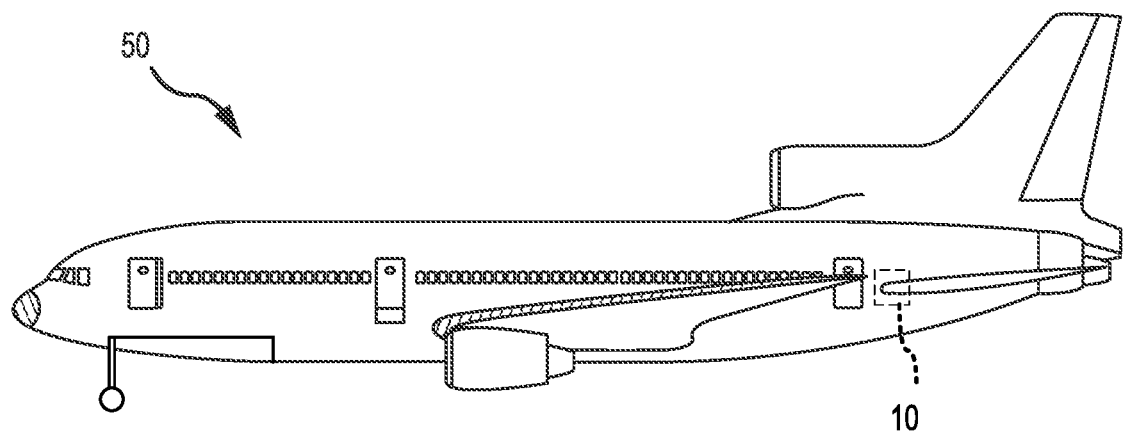
FIG. 1 illustrates an aircraft having a container for storing water, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a hybrid water storage system for an aircraft. Generally, the hybrid water storage system includes separate variable volumes for respectively storing/holding potable water and gray water occupying a common container, according to various embodiments. The hybrid water storage system is generally configured to draw potable water from a first variable volume in order to provide fresh water to one or more aircraft appliances (e.g., sinks, showers, ice-makers, etc.), and the used potable water (i.e., the potable water that is collected in drains from the aircraft appliances), referred to herein as gray water, is routed to a second variable volume that occupies the same container as the first variable volume. That is, valuable space on the aircraft may be conserved by having the gray water stored in the same container/volume from which the potable water was drawn. Although numerous details and examples are included herein pertaining to hybrid water storage systems for aircraft, the present disclosure is not necessarily so limited, and thus aspects of the disclosed embodiments may be adapted for performance in a variety of other industries (e.g., trains, vehicles, etc.). As such, numerous applications of the present disclosure may be realized.

In various embodiments, and with reference to FIG. 1, an aircraft 50 may include one or more containers 10 for retaining or storing a liquid, such as water. As mentioned above, the container 10 may define a chamber within which two separate variable volumes are disposed for respectively storing potable water and gray water. Accordingly, the container 10 of FIG. 1 may incorporate one or more details of the hybrid water storage system described in greater detail below with reference to FIGS. 2, 3, 4, 5A, 5B, and 6, according to various embodiments.

Figure 2:
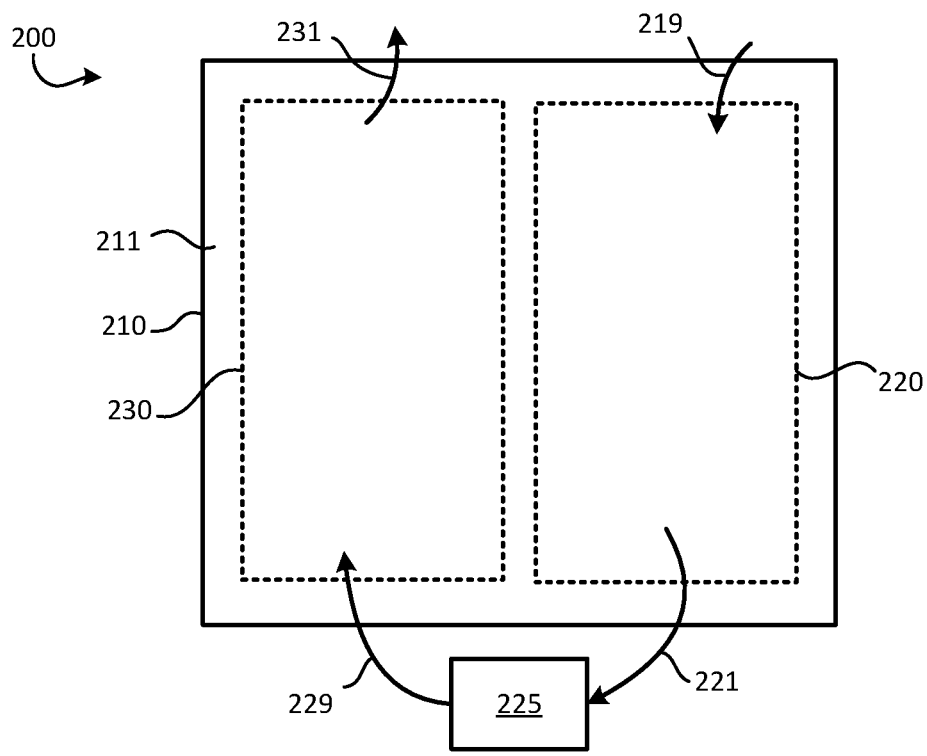
FIG. 2 is a schematic depiction of a hybrid water storage system including separate variable volumes for potable water and gray water occupying a common container, in accordance with various embodiments.

In various embodiments, and with reference to FIG. 2, the hybrid water storage system 200 includes container 210 defining a chamber 211, with a first variable volume fluid vessel 220 disposed in the chamber 211 and a second variable volume fluid vessel 230 also disposed in the chamber 211. The first variable volume fluid vessel 220 may be configured to store potable water and the second variable volume fluid vessel 230 may be configured to store gray water. The hybrid water storage system 200 may interface with a water-use assembly 225 extending between and fluidly interconnecting the first variable volume fluid vessel 220 and the second variable volume fluid vessel 230. The water-use assembly 225 may include tubing, piping, and/or manifolds for routing water between the two vessels. As described in greater detail below, the hybrid water storage system 200 may further include various inlets, outlets, and other tubing/piping/manifolds for routing water into the system, out of the system, and between components of the system. Additionally, the hybrid water storage systems depicted in the figures herein are schematic illustrations, and thus the shapes, sizes, and interconnectivity of the various components shown are not necessarily intended to represent the actual, physical shape, size, and features of the various components.

In various embodiments, and with continued reference to FIG. 2, the hybrid water storage system 200 includes a fill port 219 and a delivery port 221 for the first variable volume fluid vessel 220. That is, fresh potable water may be supplied to the first variable volume fluid vessel 220 via the fill port 219 and the potable water is delivered to the water-use assembly 225 (i.e., the various aircraft appliances) during operation via the delivery port 221. Further, and in accordance with various embodiments, the hybrid water storage system 200 includes a return port 229 and a discharge port 231 for the second variable volume fluid vessel 230. That is, gray water from the water-use assembly 225 may be collected and routed to the second variable volume fluid vessel 230 via the return port 229 and the gray water may be subsequently discharged (e.g., after the aircraft has landed) via the discharge port 231 and/or used as toilet-flush water to rinse the toilet in the lavatory.

In various embodiments, the first variable volume fluid vessel 220 and the second variable volume fluid vessel 230 are fluidly isolated from each other but for the water-use assembly 225. Said differently, the water-use assembly 225 may be the exclusive fluid communication pathway between the first variable volume fluid vessel 220 and the second variable volume fluid vessel 230. In such a configuration, the potable water is prevented from being mixed and thus contaminated with the gray water. In various embodiments, the container 210 is a rigid housing.

The variable volume fluid vessels 220, 230 may be flexible bladders 520, 530 (see below with reference to FIGS. 5A and 5B) that substantially conform to the shape of the container 210. Accordingly, the variable/changeable volumes of the vessels 220, 230 enable the potable water and the gray water to occupy the same container. Further, the flexible bladders may conform to the shape of the container, thereby allowing further freedom to optimize the shape of the container to fit in the limited confines of the aircraft.

Figure 3:
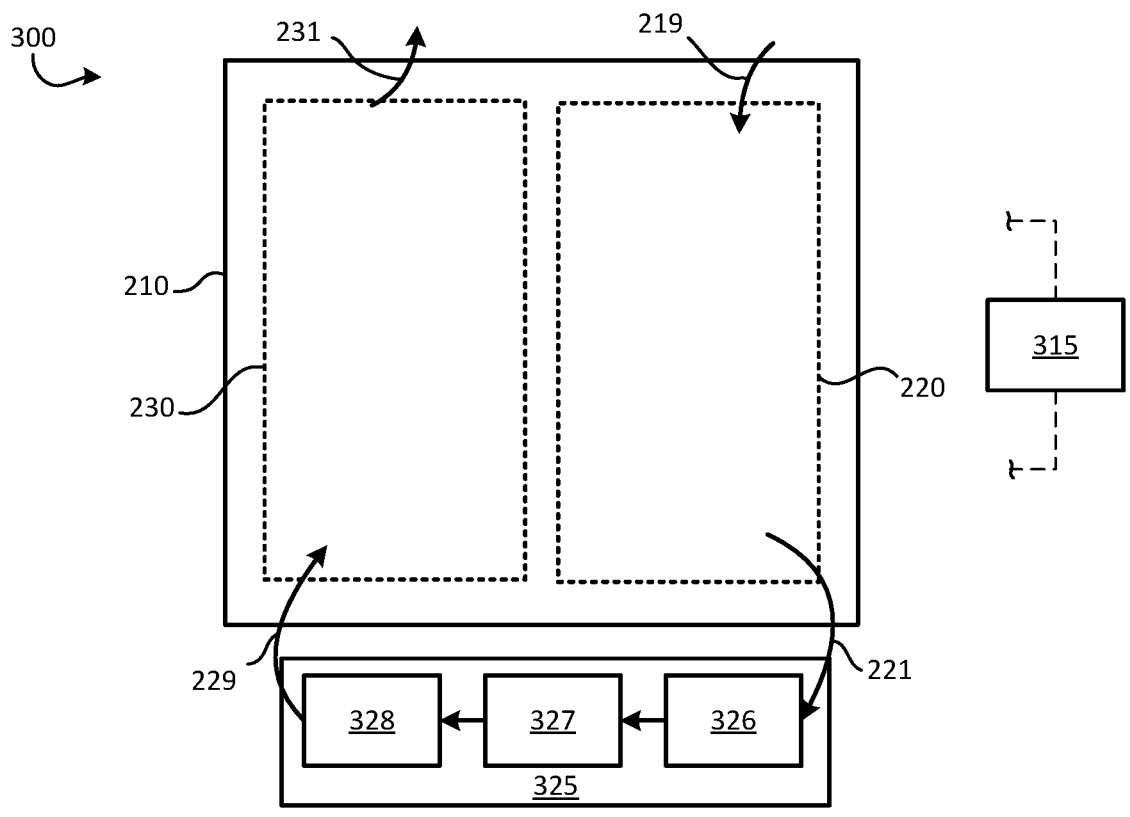
FIG. 3 is a schematic depiction of a hybrid water storage system showing multiple components of a water-use assembly, in accordance with various embodiments.

In various embodiments, and with reference to FIG. 3, the hybrid water storage system 300 includes a controller 315 in electronic control communication with one or more sensors. The one or more sensors may include water level sensors and/or water flow sensors coupled in feedback providing electronic communication with the controller 315. The term "water level sensor" may refer generally to devices that determine water quantity/volume, such as discrete level sensors, continuous level sensing devices, or other means to determine the quantity of water in the potable and gray water volumes. In various embodiments, one or more water flow sensors may be included in lines from the potable water vessels to the usage device and/or to the gray water storage volume. These flow sensors may be utilized to help the controller 315 determine if there is a blockage in one of the water lines. Accordingly, the controller 315 may be configured to actively control the water transfer between the first variable volume fluid vessel 220 and the second variable volume fluid vessel 230 via the water-use assembly 325. For example, the controller 315 may be configured to actuate one or more pumps for pumping the gray water to the second variable volume fluid vessel 230. In various embodiments, the controller 315 electronically communicates with one or more features, components, and/or sensors of the water-use assembly 325, such as the aircraft appliances 326. In various embodiments, the water-use assembly 325 comprises a gray water sump 327 and a gray water pump 328, wherein the gray water sump 327 is configured to receive the gray water from the aircraft appliance 326 and the gray water pump 328 is configured to pump the gray water from the gray water sump 327 to the second variable volume fluid vessel 230.

The controller 315 may be integrated into computer systems onboard the aircraft, or the controller may be a standalone controller. In various embodiments, controller 315 comprises a processor. In various embodiments, controller 315 is implemented in a single processor. In various embodiments, the controller 315 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The controller 315 may comprise a processor configured to implement various logical operations in response to execution of instructions, for example, instructions stored on a non-transitory, tangible, computer-readable medium configured to communicate with controller 315.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 4:
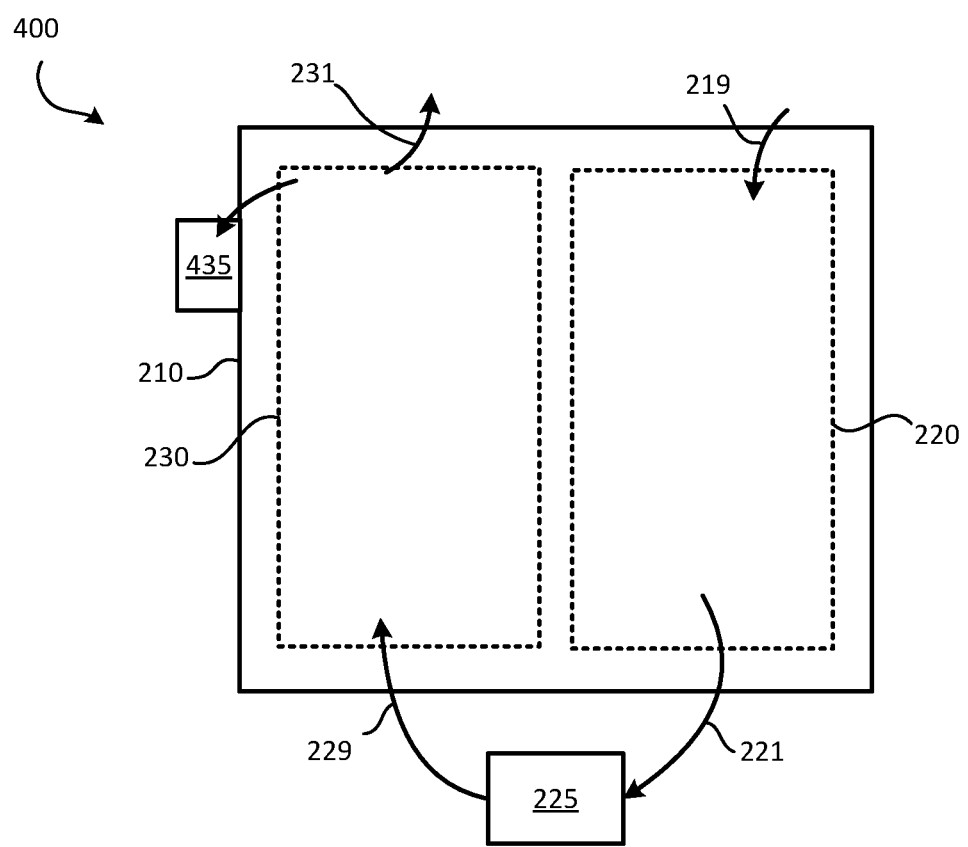
FIG. 4 is a schematic depiction of a hybrid water storage system including a gray water overflow container, in accordance with various embodiments.

In various embodiments, and with reference to FIG. 4, the hybrid water storage system 400 includes a gray water overflow container 435 coupled in fluid overflow receiving communication with the second variable volume fluid vessel 230. In various embodiments, gray water that is not sourced from the initial charge of potable water may be dumped into one or more drains of the aircraft appliances before any of the potable water is used. For example, a passenger may dump liquid into a sink drain, before any of the initial charge of potable water is utilized. Depending on how much of the space of the container 210 the first variable volume fluid vessel 220 occupies in response to the initial charge, there may not be sufficient volume for the extra gray water within the second variable volume fluid vessel 230 within the container 210, and thus the gray water overflow container 435 may serve as a buffer chamber.

Figure 5A:
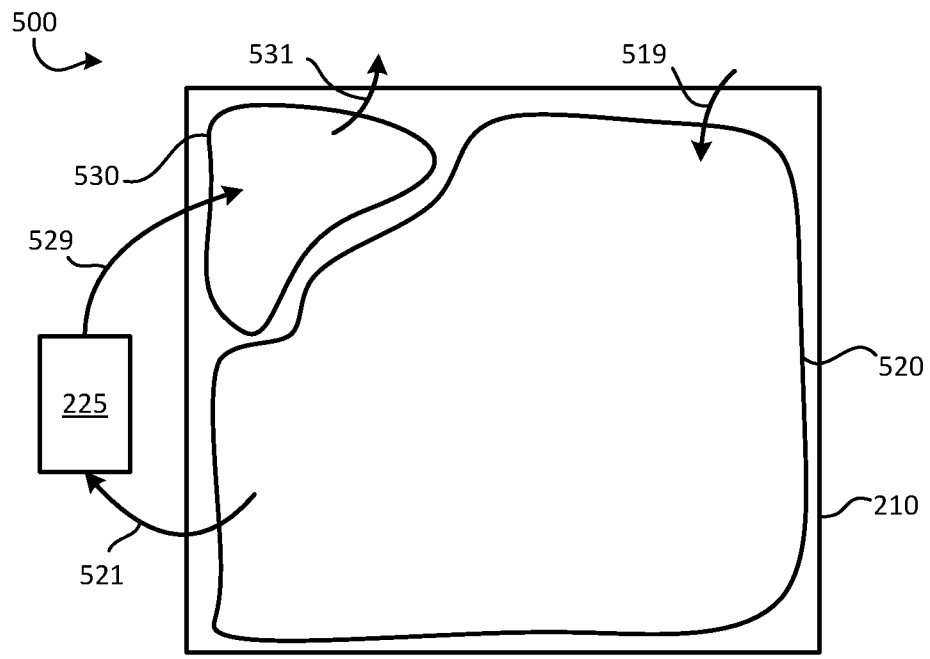
FIG. 5A is a schematic depiction of a hybrid water storage system including two separate bladders in a first state, in accordance with various embodiments.
Figure 5B:
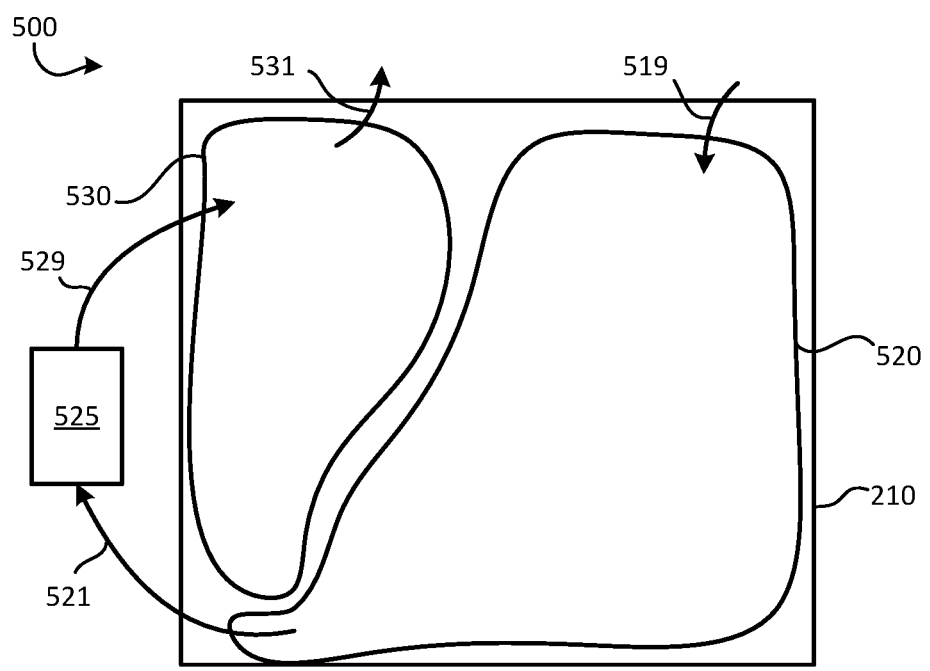
FIG. 5B is a schematic depiction of a hybrid water storage system including two separate bladders in a second state, in accordance with various embodiments.

In various embodiments, and with reference to FIGS. 5A and 5B, the hybrid water storage system 500 includes two separate bladders 520, 530. That is, the first variable volume fluid vessel may be a first bladder 520, and the second variable volume fluid vessel may be a second bladder 530. FIG. 5A shows the first bladder 520 having a volume that is substantially larger than the volume of the second bladder 530, and thus may depict the state of the hybrid water storage system 500 after an initial portion of the potable water from the first bladder 520 has been utilized, with only a small portion of gray water stored in the second bladder 530. FIG. 5B shows the first bladder 520 having a smaller volume than what is shown in FIG. 5A and the second bladder having a larger volume than what is shown in FIG. 5A, thereby showing how the decrease in the potable water supply (as the water is used) results in an increase in the gray water volume. Each of these bladders 520, 530 may be independently removable from the container 210. In such a configuration, the bladders 520, 530 may be removed to be cleaned, serviced, repaired, or replaced.

In various embodiments, the material of the bladders may be stretchable/expandable. In various embodiments, and with momentary reference to FIG. 3, the controller 315 and the gray water pump 328 are configured to pressurize the second bladder 530 with the gray water. The pressurized second bladder 530 volume may contribute to the pressure in the first bladder 520. That is, the expansion of the second bladder 530 in response to pumping the gray water thereto may apply pressure on the first bladder which is directly adjacent to the second variable volume. Accordingly, the bladders 520, 530 may be in direct contact with each other (e.g., the respective external surfaces of the bladders may be in contact with each other). In various embodiments, the bladders are not substantially stretchable/expandable, and instead take on a collapsed form when not filled with water (e.g., portions may be collapsed when not full). In various embodiments, there is little to no void space between the bladders 520, 530.

In various embodiments, a volumetric fluid capacity of the first variable volume fluid vessel is between 50% and 99% of a volume of the container. In various embodiments, a volumetric fluid capacity of the first variable volume fluid vessel is between 80% and 99% of a volume of the container. That is, when the first variable volume fluid vessel is filled to capacity, it may occupy between 80% and 99% of the volume of the container. In various embodiments, this range is between 90% and 98%. In various embodiments, this range is between 95% and 98%.

Figure 6:
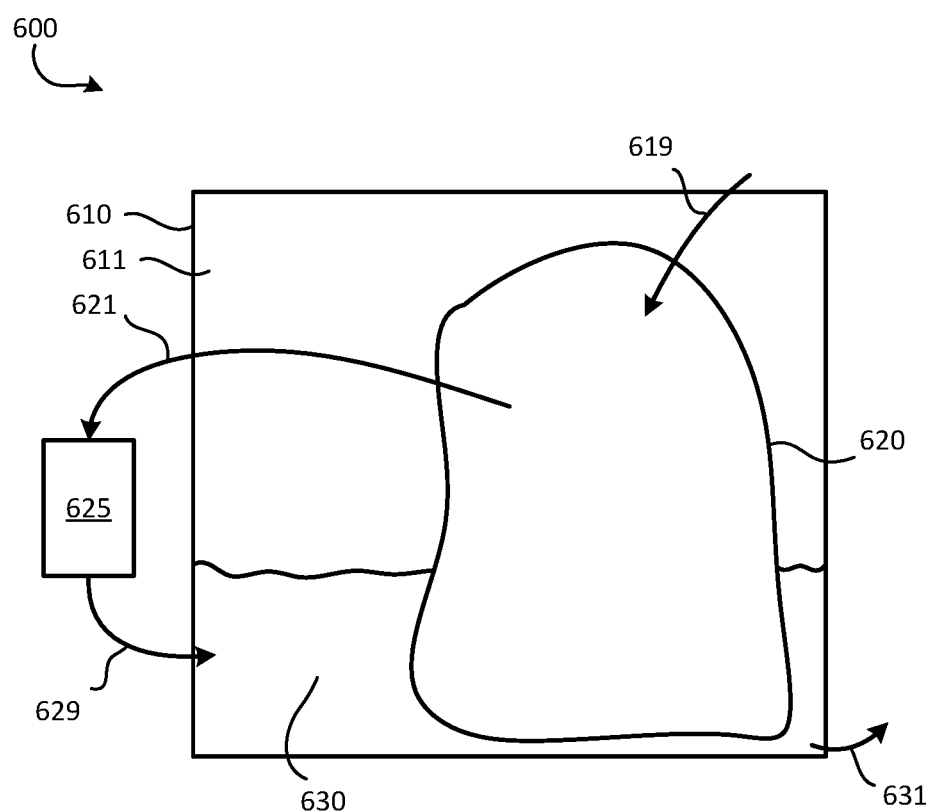
FIG. 6 is a schematic depiction of a hybrid water storage system including a bladder and a variable volume defined between external surfaces of the bladder and internal surfaces of a container, in accordance with various embodiments.

In various embodiments, and with reference to FIG. 6, the hybrid water storage system 600 includes a container 610 defining a chamber 611, with a bladder 620 disposed in the chamber 611. The bladder 620 defines a first variable volume and potable water may be configured to be stored therein. That is, potable water may be supplied to the bladder 620 via fill port 619, and potable water may be directed to the water-use assembly 625 of the aircraft via delivery port 621. The hybrid water storage system 600 may further include a second variable volume 630 defined between external surfaces of the bladder 620 and internal surfaces of the container 610. That is, the second variable volume 630 is the negative space of the container 610 around the bladder 620. The gray water may be stored in the second variable volume 630. That is, gray water may be returned to the system via return port 629, and the gray water from the second variable volume 630 may be discharged from the aircraft via discharge port 631 and/or used as toilet-flush water to rinse the toilet. The water-use assembly 625 may include the features described above.

Figure 7:
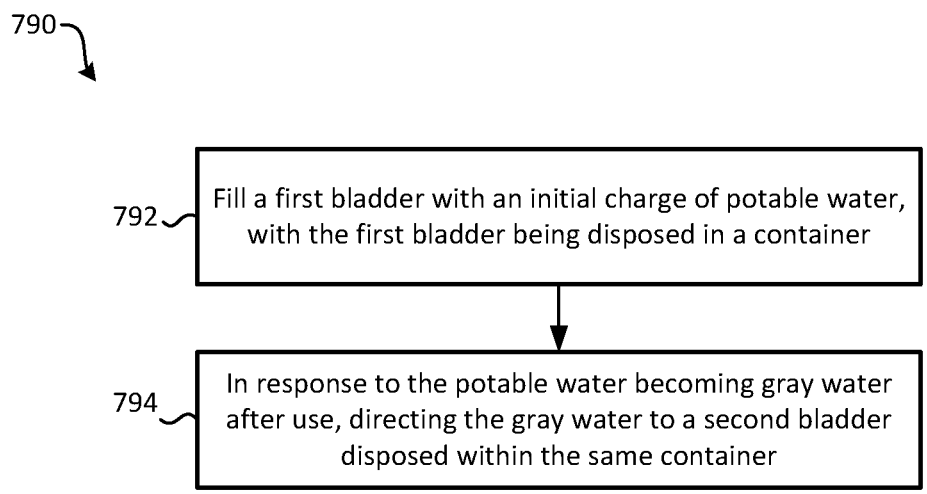
FIG. 7 is a schematic flow chart diagram of a method of managing water storage on an aircraft, in accordance with various embodiments.

In various embodiments, and with reference to FIG. 7, a method 790 of managing water storage on an aircraft is provided. The method 790 may include filling a first bladder with an initial charge of potable water, wherein the first bladder is disposed within a chamber defined by a container at step 792. In response to the potable water becoming gray water after use, the method 790 may include directing the gray water to a second bladder disposed within the same container at step 794. In various embodiments, in response to the initial charge the first bladder occupies between 90% and 98% of a volume of the chamber. In various embodiments, directing the gray water to the second bladder comprises actuating a gray water pump, by a controller, to drive the gray water to the second bladder. In various embodiments, the method 790 further includes receiving feedback, by the controller, from at least one of a water level sensor and a water flow sensor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid water storage system for an aircraft, the hybrid water storage system comprising:

a container defining a chamber;

a first variable volume fluid vessel disposed in the chamber, wherein the first variable volume fluid vessel is configured to store potable water; and a second variable volume fluid vessel also disposed in the chamber, wherein the second variable volume fluid vessel is configured to store gray water, wherein the first variable volume fluid vessel is defined between an external surface of the second variable volume fluid vessel and an internal surface of the container and wherein the second variable volume fluid vessel is defined between an external surface of the first variable volume fluid vessel and the internal surface of the container;

a water-use assembly extending between and fluidly interconnecting the first variable volume fluid vessel and the second variable volume fluid vessel, wherein potable water is supplied to the first variable volume fluid vessel via a fill port and is directed to the water-use assembly via a deliver port, and wherein gray water is returned to the second variable volume fluid vessel via a return port and is discharged from the second variable volume fluid vessel via a discharge port;

wherein the water-use assembly comprises a gray water sump and a gray water pump, wherein the gray water sump is configured to receive the gray water from an aircraft appliance and the gray water pump is configured to pump the gray water from the gray water sump to the second variable volume fluid vessel;

a controller configured to actively control a water transfer between the first variable volume fluid vessel and the second variable volume fluid vessel via the water-use assembly; and a gray water overflow container coupled in overflow receiving communication with the second variable volume fluid vessel and configured to receive the gray water from the second variable volume fluid vessel in response to the second variable volume fluid vessel having an insufficient volume to store the gray water.

2. The hybrid water storage system of claim 1, further comprising at least one of a water level sensor and a water flow sensor coupled in feedback providing communication with the controller.

3. The hybrid water storage system of claim 1, wherein a volumetric fluid capacity of the first variable volume fluid vessel is between 80% and 99% of a volume of the chamber.

4. The hybrid water storage system of claim 1, wherein a volumetric fluid capacity of the first variable volume fluid vessel is between 90% and 98% of a volume of the chamber.

5. The hybrid water storage system of claim 1, wherein a volumetric fluid capacity of the first variable volume fluid vessel is between 95% and 98% of a volume of the chamber.

* * * * *